US011977636B2

(12) United States Patent
Kawaguchi (10) Patent No.: US 11,977,636 B2
(45) Date of Patent: May 7, 2024

(54) STORAGE TRANSACTION LOG

(71) Applicant: Hitachi, Ltd., Tokyo (JP)

(72) Inventor: Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 322 days.

(21) Appl. No.: 17/474,907

(22) Filed: Sep. 14, 2021

(65) Prior Publication Data
US 2023/0079432 A1 Mar. 16, 2023

(51) Int. Cl.
G06F 21/56 (2013.01)
G06F 3/06 (2006.01)
G06F 21/55 (2013.01)
G06F 21/78 (2013.01)

(52) U.S. Cl.
CPC ......... G06F 21/568 (2013.01); G06F 3/0611 (2013.01); G06F 3/0619 (2013.01); G06F 3/064 (2013.01); G06F 3/0659 (2013.01); G06F 3/0673 (2013.01); G06F 21/554 (2013.01); G06F 21/78 (2013.01)

(58) Field of Classification Search
CPC ....... H04L 9/00; H04L 9/0838; H04L 63/145; H04L 63/0428; G06F 9/54; G06F 21/445; G06F 21/57; G06F 21/606; G06F 21/83; G06F 21/84; G06F 2221/033; G06F 21/568; G06F 21/554; G06F 21/78; G06F 3/0611; G06F 3/0619; G06F 3/064; G06F 3/0659; G06F 3/0673
See application file for complete search history.

(56) References Cited

U.S. PATENT DOCUMENTS

| 10,025,931 | B1 * | 7/2018 | Natanzon | G06F 21/78 |
| 10,079,842 | B1 * | 9/2018 | Brandwine | H04L 63/1441 |
| 2017/0103200 | A1 * | 4/2017 | Uehara | G06F 21/566 |
| 2018/0217910 | A1 * | 8/2018 | Yang | G06F 11/3006 |
| 2020/0387430 | A1 | 12/2020 | Hironaka et al. | |

OTHER PUBLICATIONS

Yang and Sahita, "Towards a Resilient Machine Learning Classifier—a Case Study of Ransomware Detection" Security and Privacy Research, Intel Labs, Hillsboro, Oregon, presented at the Conference on Applied Machine Learning for Information Security 2019, Washington DC.

* cited by examiner

*Primary Examiner* — Thaddeus J Plecha
(74) *Attorney, Agent, or Firm* — Procopio, Cory, Hargreaves & Savitch LLP (57) ABSTRACT

Example implementations described herein provide systems and methods for detecting damage to data by malware and involve generating log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and, for a request by a management server to provide the log information for a specified time range for the storage device, returning, from the storage device, the logical block information and the compression ratio associated with the time information within the specified time range.

15 Claims, 9 Drawing Sheets

| Sequential# | Time | Vol# | Vol LBA | Original Length | Pool LBA | Compressed Length |
|---|---|---|---|---|---|---|
| 1 | 1612839660 | 101a | 3881057 | 32 | 0 | 4 |
| 2 | 1612839660 | 101a | 3882057 | 32 | NULL | 12 |
| 3 | 1612839660 | 101b | 4728190 | 512 | 4 | 256 |
| 4 | 1612839661 | 101a | 3892057 | 32 | 260 | 32 |
| 5 | 1612839661 | 101b | 2087288 | 512 | 292 | 64 |
| 6 | 1612839661 | 101b | 3929212 | 8 | 356 | 4 |
| 7 | 1612839661 | 101c | 1023931 | 32 | 360 | 24 |
| 8 | 1612839661 | 101a | 7223741 | 8 | 384 | 8 |
| 9 | 1612839661 | 101a | 3882057 | 32 | 392 | 2 |
| 10 | 1612839662 | 101b | 3930000 | 512 | 394 | 512 |
| 11 | 1612839662 | 101a | 2198573 | 8 | 906 | 4 |
| 12 | 1612839662 | 101c | 1023256 | 32 | 910 | 16 |
| 13 | 1612839662 | 101c | 1023990 | 32 | 926 | 4 |
| ... | ... | ... | ... | ... | ... | ... |

STORAGE TRANSACTION LOG

BACKGROUND

Field

The present disclosure is generally related to storage systems, and more specifically, to systems and methods for detecting malware and data tampering storage systems based on data access logs.

Related Art

In Information Technology (IT) systems, it is required for a storage apparatus to securely store a backup of data stored in the storage apparatus and to spread the data quickly when necessary. In related art implementations, there is a method for detecting occurrence of damage (e.g., data tampering) by malware that involves monitoring a frequency of data access by the malicious software, target data being accessed, and characteristics of the data being stored (such as data entropy which can be approximated by compression ratio). Such a method may be useful for malware that encrypts and tampers with data, which are referred to ransomware. Using the related art method, a technique has been devised to identify a start time of ransomware execution and restore the tampered data from the backup data prior to the identified start time.

In general, for the related art implementations, it is necessary to introduce a mechanism that monitors data input/outputs (I/O) between each application that is accessing the data and the device storing the data being accessed, resulting in installation of a mechanism in every application environment. Additionally, the mechanism has to maintain the log of I/Os.

An example related art implementation provides a method of detecting activity of ransomware by machine learning with data access logs. Another example related art implementation provides a method of restoring data according to detection of data tampering.

SUMMARY

Related art implementations require installation of a mechanism to monitor data I/O between each application accessing the data and device storing the data being accessed. Installing this mechanism in every application environment is cumbersome, and requires individualized mechanisms for each application. Furthermore, each mechanism must maintain a log of data I/Os. The capacity of each log can be huge, thus requiring additional resources by the mechanism to maintain the logs. In addition, ransomware and other malware cannot be detected until a logging system is built, and if the infection occurs before the system is built, it is difficult to determine when the infection occurred.

To solve these problems, example implementations described herein involve systems and methods in which information of data storage is retained by the storage device, such as data storage time, address, compression ratio, etc. Example implementations output a log of the information to be analyzed by a requesting device.

Example implementations described herein can be used as a mechanism to detect malware in IT systems based on data access logs. Thus, by retaining information on data storage at the storage device, example implementations disclosed herein eliminate the need to install a monitoring mechanism on the application side, thereby eliminating the need to install access log monitoring software for individual applications. Further, the example implementations disclosed herein eliminate the need to prepare storage at individual monitoring mechanisms for storing I/O logs and also reduces the size of the logs to be stored.

Aspects of the present disclosure can involve a method for detecting damage to data by malware, the method involving generating log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and, for a request by a management server to provide the log information for a specified time range for the storage device, returning, from the storage device, the logical block information and the compression ratio associated with the time information within the specified time range.

Aspects of the present disclosure can involve a system for detecting damage to data by malware, the system involving a storage device configured to generate log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and a management server configured to request the storage device provide the log information for a specified time range. The storage device is further configured to, for the request by a management server to provide the log information, return the logical block information and the compression ratio associated with the time information within the specified time range.

Aspects of the present disclosure can involve a storage device for detecting damage to data by malware, the storage device involving one or more memory configured to store instructions and one or more processors configured to execute the instructions stored in the memory to: generate log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and, for a request received from a management server to provide the log information for a specified time range, return to the management server the logical block information and the compression ratio associated with the time information within the specified time range.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Further, in the following description, the information is expressed in a table format, but the information may be expressed in any data structure. Further, in the following description, a configuration of each information is an example, and one table may be divided into two or more tables or a part or all of two or more tables may be one table.

Prior art implementations required introduction of a monitoring mechanism to monitor data input/outputs (I/O) between each application accessing data and the storage device storing the data being accessed. Each individualized monitoring mechanism would maintain a log of the I/O and output the log to an analyzing device. Thus, in the prior art implementations, when the storage device was suspected of being infected with a malicious application, the monitoring mechanism for that application would start collecting access logs, and then analyze the I/O logs afterward. These prior art implementations do not store time information, and thus it is impossible for an analyzing device to obtain information about timing characteristics of data I/Os. Further, typically, when data is overwritten, both the data and the related metadata is overwritten. Thus, access logs for overwrite operations prior to being suspected of infection cannot be generated and are lost, becoming useless for analysis.

Example implementations disclosed herein eliminate the need for individualized monitoring mechanisms by retaining information of data storage characteristics at the storage device. The data storage characteristics may be metadata for write I/O operations. For example, retained information may include, but is not limited to, data storage time, storage address, compression ratio, etc. When there is suspicion of a malicious attack, an analyzing device retrieves, from the storage device, and analyzes access logs of I/Os which the storage device generates from the retained information.

Example implementations herein store time information in metadata for each data I/O. In some example implementations, the time information is stored with the storage address. In another example implementation, alone or in combination, a marker may be periodically (e.g., every second) inserted with the time information.

In example implementations disclosed herein, metadata for each I/O operation within an preset time limit from the current time will not be deleted. Any overwritten data can be deleted, but the corresponding metadata will be maintained. In this way, the metadata may be retained by the storage device for use in generating I/O logs for analysis. In some example implementations, metadata that exceeds the preset time limit may be deleted. The preset time limit may be set within a monitoring policy.

Figure 1:
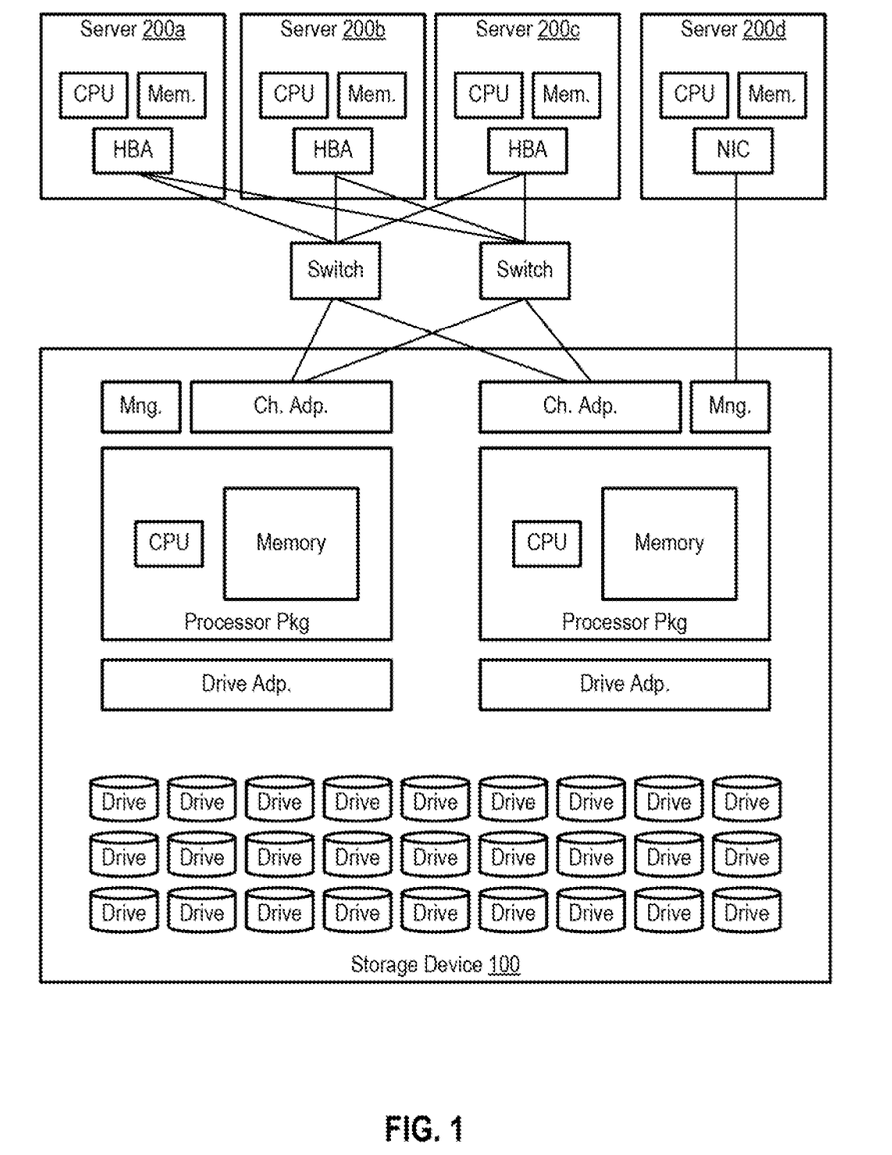
FIG. 1 illustrates an example of a system, in accordance with example implementations disclosed herein.

FIG. 1 illustrates an example of a system upon which example implementations disclosed herein can be applied. The system can include multiple servers 200a-200d and a storage device 100 that are connected via a network through network switches. Each server 200a-200d may referred to individually with reference to its respective reference number (e.g., 200a, 200b, 200c, 200d, etc.) or collectively as servers 200. Reference to the servers 200 collectively does not imply that each server is identical or configured to function in an identical manner, but is used herein to refer to aspects that may be common between the servers 200. The network connection routes can be redundant for improved availability and throughput performance.

The storage device 100 can include one or more management adapters (Mng.), one or more channel adapters (Ch. Adp.), one or more drive adapters (Drive Adp.), one or more processor packages (Processor Pkg.), and one or more drives. Each management adapter can be connected to a server and configured for managing and retrieving information from storage device 100. For example, as shown in the illustrative example of FIG. 1, one of the management adapters is connected to server 200d (sometimes referred to herein as a management server). Channel adapters can be connected to one or more servers and configured to provide access to data stored in the storage device 100. For example, as shown in the illustrative example of FIG. 1, the channel adapters are connectors to servers 200a, 200b, and 200c for access, by each server, to data stored in the storage device 100. The drive adapters are configured as connectors between each respective processor package and the plurality of drives. Each processor package may comprise a central processing unit (CPU) and a memory module, and each CPU may be configured to control the storage device 100 using programs, tables, and data stored in memory modules. Drives are configured to store data and metadata for the data.

Each server 200 may comprise a memory module and a CPU for executing programs stored on the memory. Furthermore, each server 200 also comprises one or more adapters configured to facilitate connection to the storage device 100. For example, each server 200 may comprise a host bus adaptor (HBA) and/or a network interface controller (NIC). In a case where a given server is connected to a channel adapter of the storage device 100, the HBA is selected as the adapter for a respective server (e.g., servers 200a-200c in the example shown in FIG. 1). In a case where a server is connected to a management adapter of storage device 100, the NIC is selected as the adapter for a respective server (e.g., server 200d in the example shown in FIG. 1). While four servers are illustrated in FIG. 1, it will be appreciated that any suitable number of servers may be connected to the storage device 100.

Figure 2:
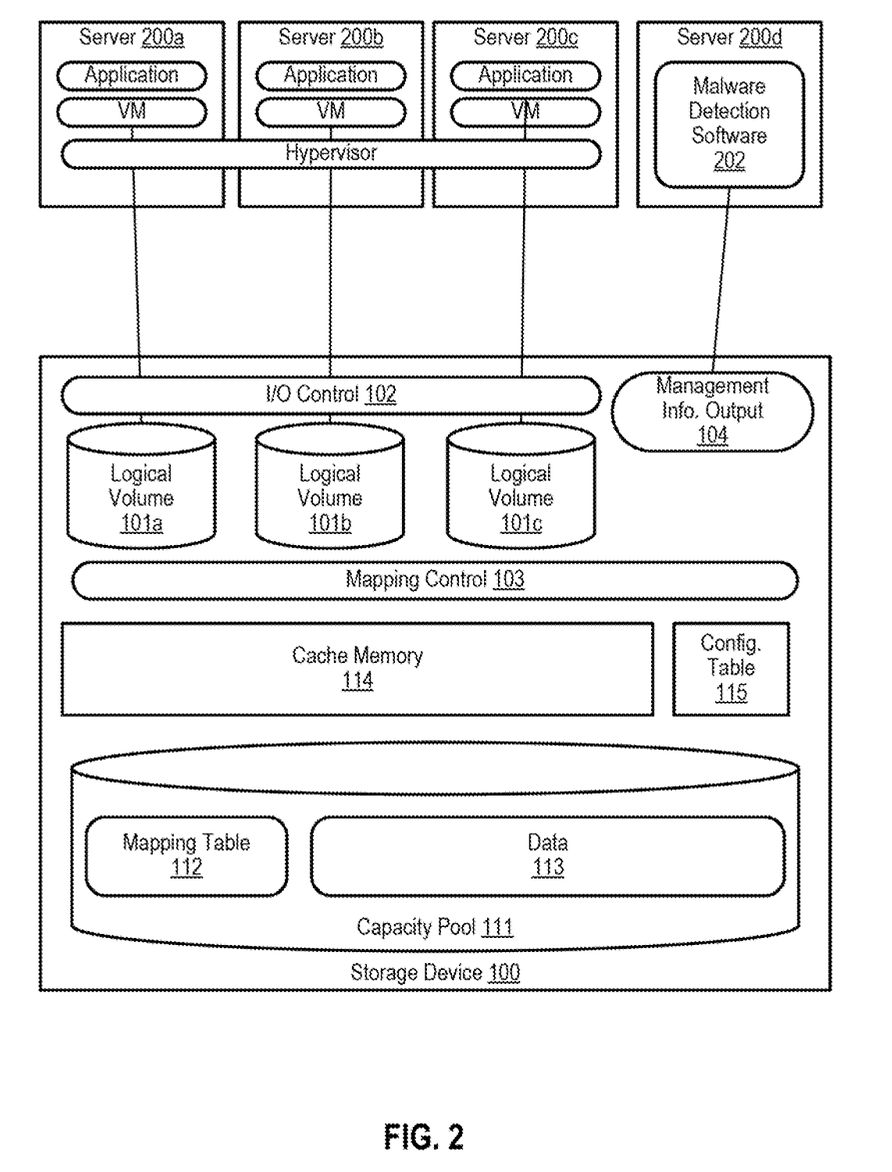
FIG. 2 illustrates a logical configuration of the system of FIG. 1, in accordance with example implementations disclosed herein.

FIG. 2. illustrates an example logical configuration of the system of FIG. 1. As described above, the system can include multiple servers 200a-200d connected to storage device 100 via a network.

In the illustrative example shown in FIG. 2, servers 200a-200c each comprise an application, an iteration of a virtual machine, and virtual machine monitor (e.g., a hypervisor). Server 200d of FIG. 2 comprises malware detection software 202. While certain servers are shown in FIG. 2, it will be appreciated that any suitable number of servers running applications (e.g., such as servers 200a-200c) may be connected to the storage device 100 and any suitable number of servers running malware detection software (e.g., similar to server 200d) may be connected to the storage device 100. Malware detection software may be established in a physical server 200d, a virtual machine, or as a container implemented as a Software as a Service (SaaS), depending on the desired implementation.

The storage device 100 may provide a plurality of logical volumes (e.g., logical volumes 101a, 101b, and 101c, collectively referred to as logical volumes 101) and a capacity pool 111 for servers 200a, 200b, 200c. Server 200a can be provided access to logical volume 101a, server 200b to logical volume 101b, and server 200c can access logical volume 101c via the input/output (I/O) control 102. The capacity pool 111 comprises a plurality of drives (e.g., physical drives of FIG. 1 storing data) to server capacity for logical volumes 101. The capacity pool 111 stores data 113 and a mapping table 112, which includes metadata for the data 113. The data 113 and mapping table 112 may be accessed via cache memory 114 (e.g., a cache memory included in memory modules of FIG. 1). A configuration of the logical volumes 101 and capacity pool 111 may be managed by configuration table 115 stored in the memory modules of FIG. 1.

The storage device 100 also includes I/O control 102 and a mapping control 103. The I/O control 102 controls access to the storage device 100 by one or more of server 200a, 200b, and/or 200c. For example, the I/O control 102 controls the process to access data stored in the cache memory 114. Mapping control 103 controls staging/destaging between the cache memory 114 and the capacity pool 111.

The storage device 100 also includes a management information output 104 that controls access to the storage device 100 by the server 200d. The management information output 104 may be provided by the management adapters (Mng.) of FIG. 1 and accessed by the server 200d via a NIC of server 200d. When the server 200d accesses the storage device 100, the management information output 104 outputs an access log to the malware detection software 202. The access log is gathered by the mapping control 103 and provided to the management information output 104.

Figure 4:
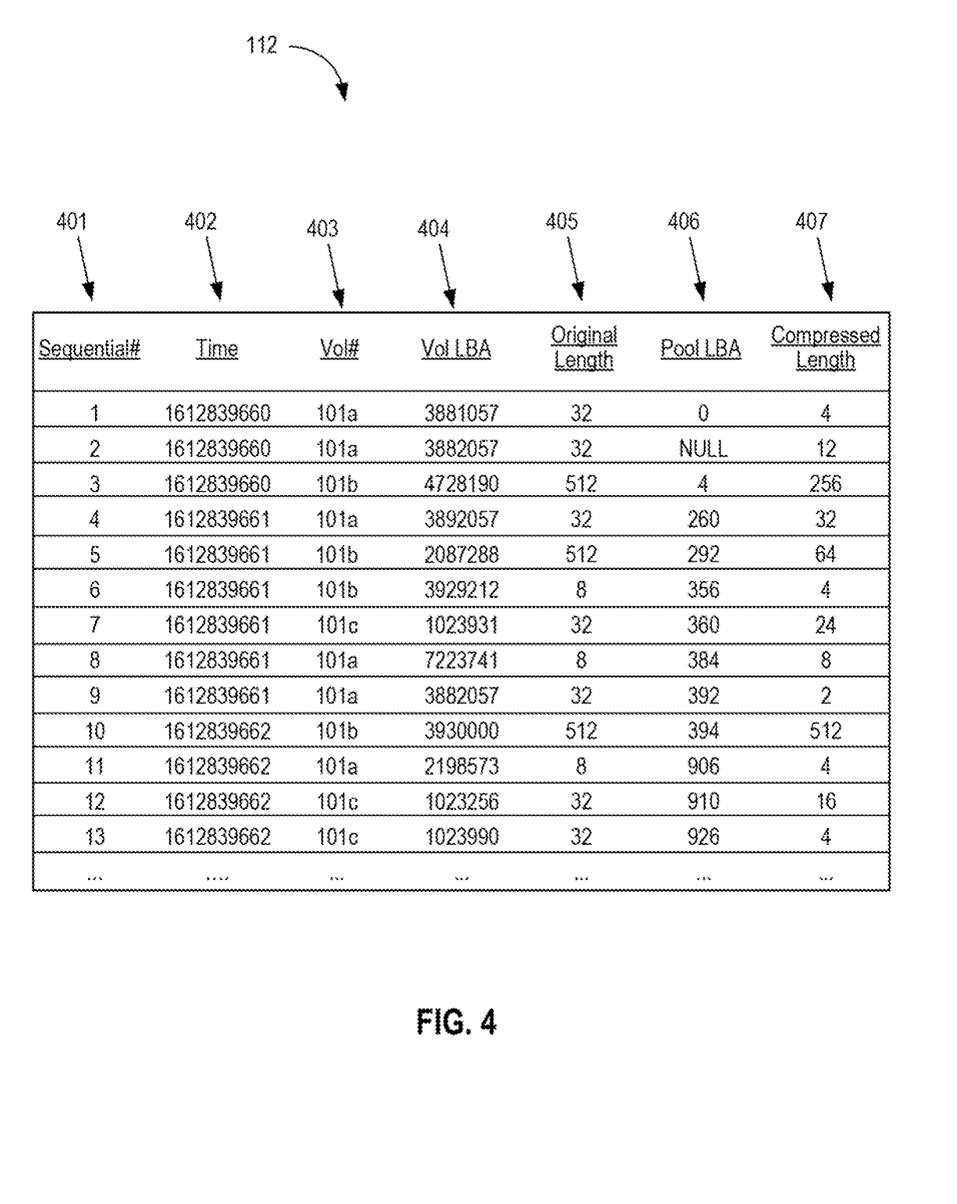
FIG. 4 illustrates an example mapping table of a write I/O, in accordance with example implementations disclosed herein.

The I/O control 102, the management information output 104, and the mapping control 103 of FIG. 4 may be programs each stored in one or more of the memory modules of storage device 100 of FIG. 1. The programs may be executed by one or more of the CPUs of the storage device 100 of FIG. 1 to perform the functions disclosed herein. For example, the one or more CPUs may execute a program instantiation of the I/O control 102 and mapping control 103 to perform write I/O process 500 of FIG. 5; the one or more CPUs may execute a program instantiation of the I/O control 102 and mapping control 103 to perform read I/O process 600 of FIG. 6; the one or more CPUs may execute a program instantiation of the management information output 104 and mapping control 103 to perform I/O log output process 700 of FIG. 7.

Figure 3:
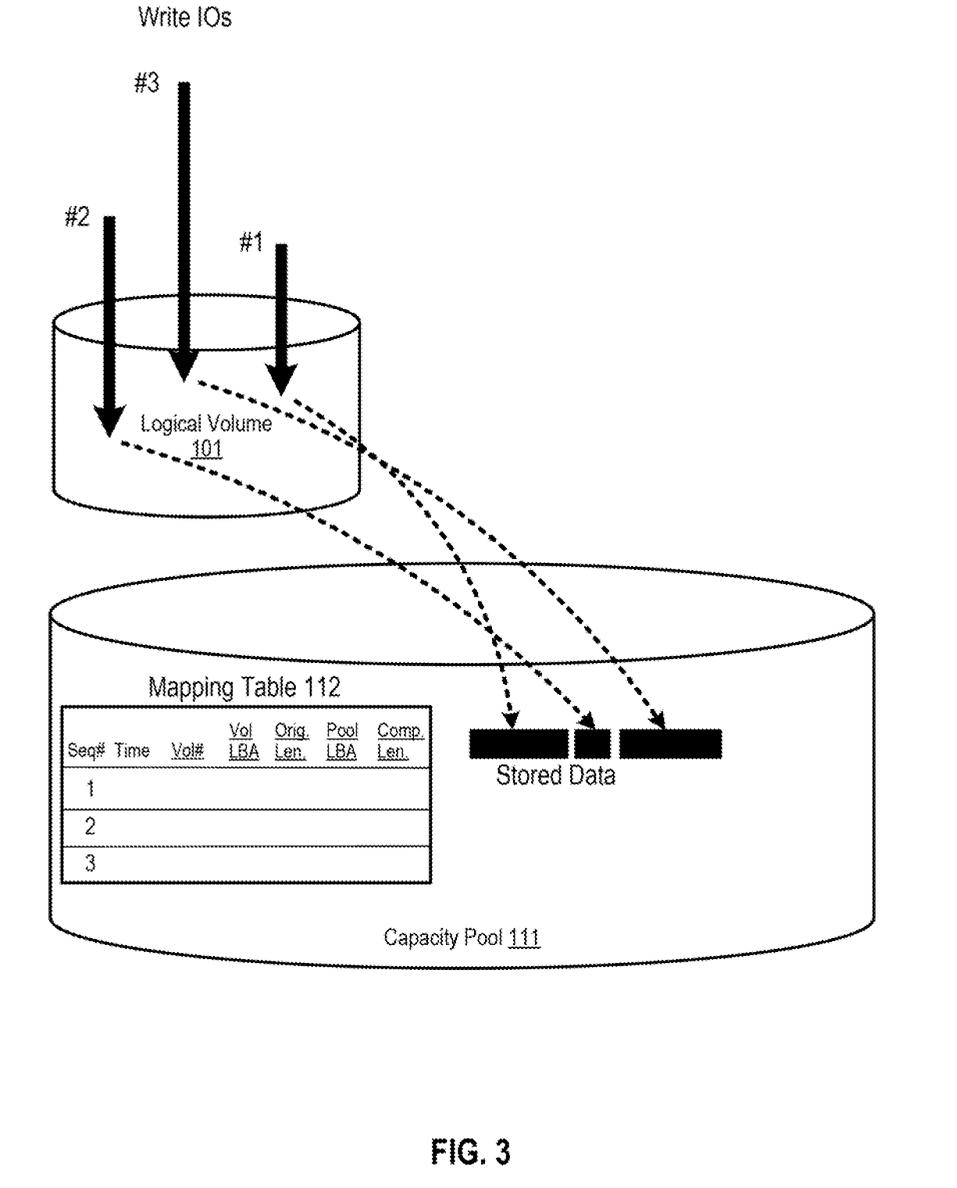
FIG. 3 illustrates an example of write input/output (I/O), in accordance with example implementations disclosed herein.

FIG. 3 illustrates an overview of example data write I/O. As shown in FIG. 3, multiple write I/Os are performed, for example, by one or more servers 200a-200c of FIGS. 1 and 2, that write data to a respective logical volume 101 (e.g., server 200a writes to logical volume 101a). In this case, three write I/Os are performed labeled #1-#3 and each are performed in sequential order from #1 to #3. Each write I/O need not be executed by the same sever, and may be performed by any one of servers 200a-200c or the like. As an example, one or more servers 200a-200c transmit the write I/Os #1-#3 that are received by the I/O control 102, which writes the data to a respective logical volume.

Each logical volume 101 to which data is written via write I/Os #1-#3 stores the data in capacity pool 111 (e.g., as shown by the dotted arrows in FIG. 3) with a controlled write order, under control by the mapping control 103. The write order (e.g., the sequential order in which each write I/O was executed at the logical volumes 101) and destination address with the physical drives of the capacity pool 111 are stored in the mapping table 112, under control by the mapping control 103. The destination addresses do not have to be contiguous nor sequential, and may be distributed or fragmented about the physical drives. The order and destination may be managed in the mapping table 112.

Metadata for each I/O is extracted by the mapping control 103, which inserts the extracted metadata into the mapping table 112 according to the write order. Furthermore, the mapping control 103 generates additional metadata, as described below, as part of storing data to the capacity pool 111 and inserts the generated metadata into the mapping table 112.

Additionally, if data is overwritten or otherwise removed by a write I/O, the data may be deleted from the capacity pool 111 by a garbage collection process. However, the metadata in mapping table 112 is retained, even when the data to which the metadata refers is deleted. In various examples, the metadata may be retained for a preset time limit from the current time, as set in a monitoring policy (described below).

FIG. 4 illustrates an example mapping table 112, in accordance with example implementations disclosed herein. FIG. 4 shows an example configuration for mapping table 112, which comprises a plurality of entries, each entry corresponding to a given write I/O. The mapping table 112 includes metadata for each write I/O inserted into each corresponding entry, for example, by the mapping control 103 during a write I/O. The metadata for each entry includes values for at least sequential number 401, time 402, volume number 404, volume logical block address (LBA) 404, original length 405, pool LBA 406 and compressed length 407.

Sequential number 401 indicates a value for the write order. A value is inserted into mapping table 112 or each entry at sequential number 401 indicative of the sequential order that the respective write I/O has been received by the storage device. As illustrated in FIG. 4, the entries of the mapping table 112 may be ordered according to the values of the sequential number 401. However, the entries need not be ordered as such. As long as the sequential number 401 is provided for each entry, the write order may be determined therefrom.

Values for time 402 may include a timestamp that indicates the time each respective write I/O was executed. For example, entries for time 402 may be a timestamp of when the storage device 100 receives the write I/O. In another example, entries for time 402 may be a timestamp of when the storage device 100 returns a completion message, to a requesting server, acknowledging completion of the received write I/O. As shown in FIG. 4, one or more values for time 402 in different entries may be the same, indicating that each entry was performed at the same time.

Values for volume number 403 indicate an identifier of a logical volume 101 on which each respective write I/O occurred. For example, a value of 101a indicates that the corresponding write I/O occurred at the logical volume 101a of FIG. 2, a value of 101b indicates that the corresponding write I/O occurred at the logical volume 101b of FIG. 2, and a value of 101c indicates that the corresponding write I/O occurred at the logical volume 101c of FIG. 2. The value inserted in volume number 403 may be any identifier that uniquely identifies the logical volume on which the respective write I/O occurred, values of 101a, 101b, and 101c are used herein only for illustrative purposes.

Values for volume LBA 404 indicate a top LBA of each respective write I/O. The value of volume LBA 404 provide a first logical block address (e.g., top) to which the data of the respective write I/O was written. The value of the top LBA 404 may provide for locating the beginning portion of data written to the capacity pool 111 of a respective write I/O. For example, storage device 1000 may store data in multiple contiguous blocks. For instance, the storage device 100 may receive a 64 KB write I/O and use 16 blocks if the block size is 4 KB. The address of the first block in the contiguous blocks is an example of "top LBA (logical block address)," which may be the value entered in volume LBA 404.

Values for original length 405 indicate a number of logical blocks utilized by each respective write I/O. The values of the original length 405 and the volume LBA 404 provide the address location of data for a respective original write I/O in the respective logical volume 101.

Values in pool LBA 406 indicate top logical block address of stored data in the capacity pool 111 by each respective write I/O. For example, as described in connection with FIG. 3, a write I/O to a respective logical volume 101 causes storage data to the physical drives of the capacity pool 111. Values in the pool LBA 406 indicate the top (e.g., first or starting) location of the data for each write I/O within the physical drives of the capacity pool 111. Pool LBA 406 may be changed by data deletion, moving of data, garbage collection process, etc. If data deletion by a data overwrite process or other data removal process occurred, the Pool LBA 406 may be changed to NULL to clarify the data is not available. However, the entry is maintained without deletion, at least for the preset time limit and/or until the free space on the storage device is exhausted.

Values in compressed length 407 indicate number of logical blocks utilized for storage of the data for each respective write I/O after compression. For example, after a respective write I/O writes to a logical volume 101, the data compression algorithm may be executed on the data to reduce the amount of storage space required for storing the data and the compressed data is stored on the physical drives of the capacity pool. The number of logical blocks for this compressed length is inserted into the mapping table 112 as compressed length 407. Compression ratio may be determined based on the value of compressed length 407 and the value of original length 405 (e.g., value of original length 405 divided by value of compressed length 407). The values of the compressed length 407 and the pool LBA 406 may provide the address location of data for a respective write I/O in the respective capacity pool 111.

Figure 5:
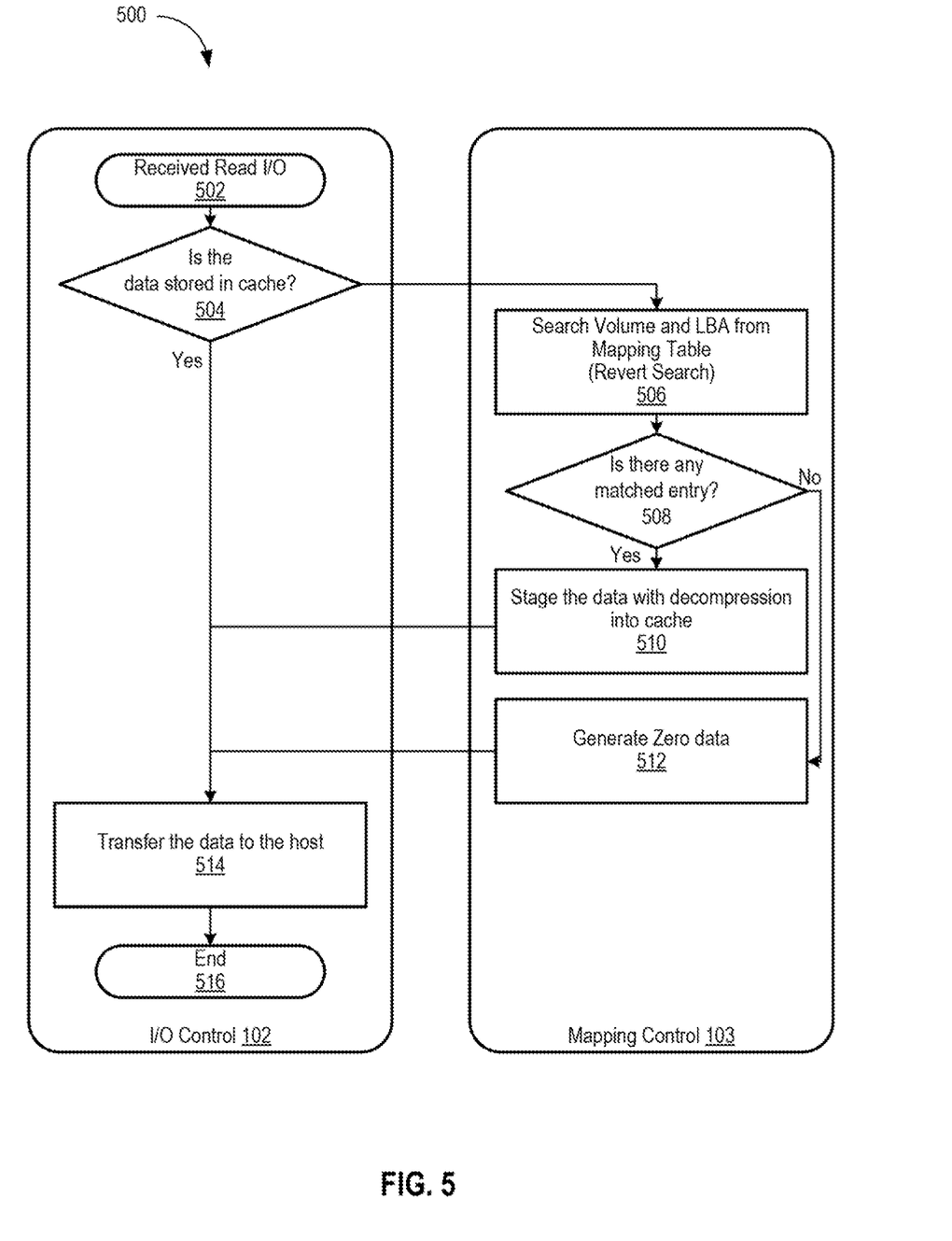
FIG. 5 illustrates a flow diagram for an example read I/O process, in accordance with example implementations disclosed herein.

FIG. 5 illustrates a flow diagram for an example read I/O process 500, in accordance with example implementations disclosed herein. The I/O control 102 and mapping control 103 perform for read I/O as process 500. The I/O control 102 transfers data stored in cache memory 114 to an accessing server (e.g., one of servers 200a-200c). For example, the accessing server provides a read I/O to the control 102 that includes input information for locating the data. Input information may include a type of I/O (e.g., read I/O in the process 500), volume number, a volume LBA (e.g., top LBA), and an original length of data to be accessed. Then, the mapping control 103 may stage the data to cache memory 114 from the capacity pool 111 based on the input information.

The process 500 starts when the storage device 100 receives a read I/O from an accessing server. For example, at step 502 the I/O control 102 receives a read I/O.

At step 504, the I/O control 102 searches data stored in cache memory 114 based on input information included in the read I/O. If the requested data is in the cache, process 500 proceeds to step 514. Otherwise, the process 500 proceeds to step 506 to stage data to cache memory 114.

At step 506, the mapping control 103 searches entries in the mapping table 112 based on the input information. For example, the mapping control 103 searches the entries of the mapping table and matches volume number 403 and volume LBA 404 in the mapping table 112 with the volume number and volume LBA included with the read I/O.

At step 508, the mapping control 103 determines whether any of the entries in the mapping table 112 matches the read I/O. If there is the matched entry, the process 500 proceeds to step 510. Otherwise, process 500 proceeds to step 512.

At step 510, the mapping control 103 reads the data from capacity pool 111 based on the matched entry from the mapping table 112. For example, the mapping control 103 uses the pool LBA 406 and compresses length 407 corresponding to the matched entry from the mapping table 112 to locate the physical drives of the matched entry, decompresses the compressed data, and stages the decompressed data to cache memory 114. Once staged to the cache memory 114, the process 500 proceeds to step 514.

At step 512, the mapping control 103 generates zero data into cache memory 114 for the read I/O because there is no written data, and the process proceeds to step 514.

At step 514, the I/O control 10 transfers the staged data to the accessing server as a response to the read I/O. Then, at step 516, the process ends.

Figure 6:
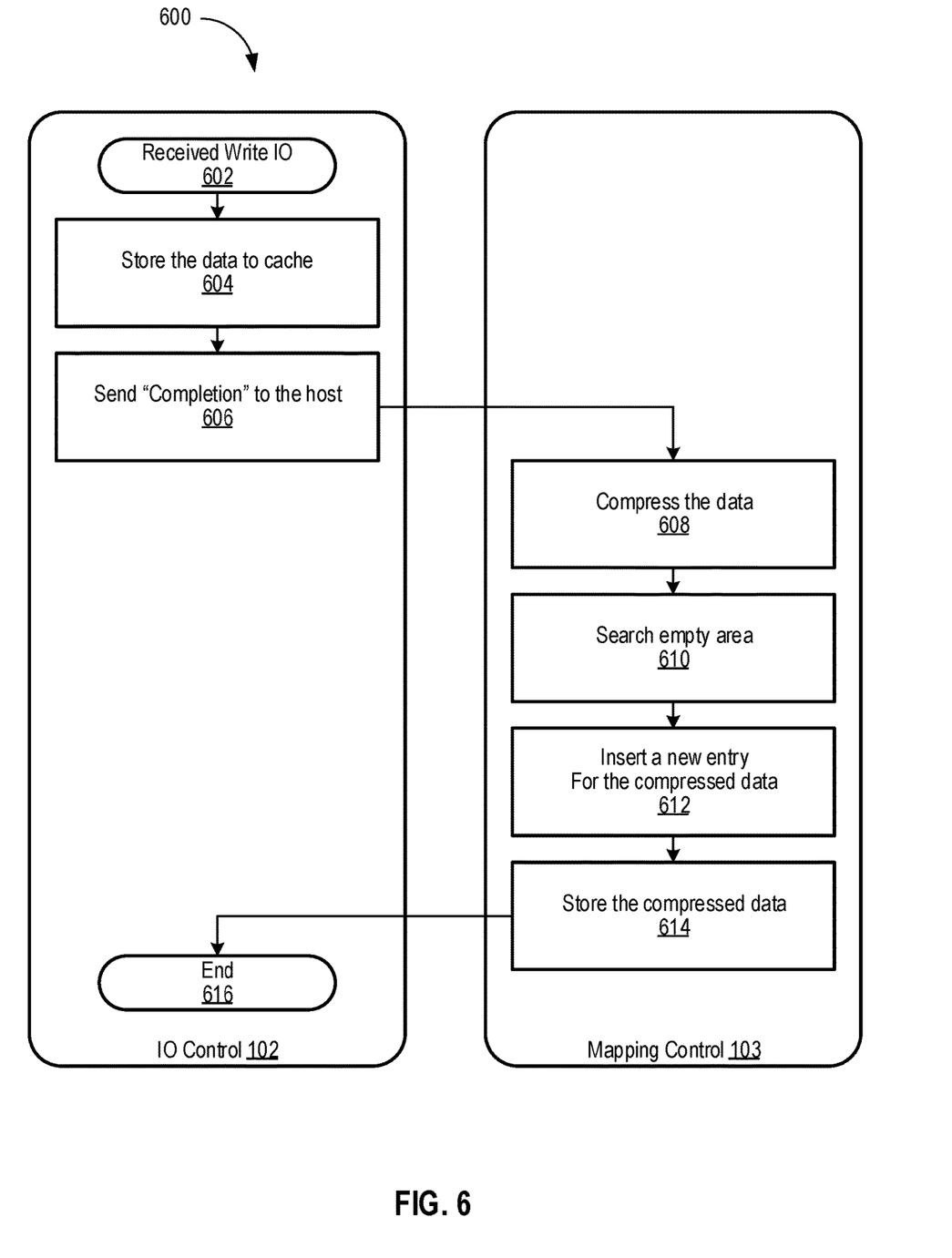
FIG. 6 illustrates a flow diagram for an example write I/O process, in accordance with example implementations disclosed herein.

FIG. 6 illustrates a flow diagram for an example write I/O process 600, in accordance with example implementations disclosed herein. The I/O control 102 and mapping control 103 perform for write I/O as process 600. The I/O control 102 stores data into the cache memory 114 from an accessing server (e.g., one of servers 200a-200c). For example, the accessing server provides a write I/O to the control 102 that includes input information for storing the data. Input information may include a type of I/O (e.g., write I/O in the process 600), volume number, a volume LBA (e.g., top LBA), and an original length of data as metadata, along with the data to be stored. Then, the mapping control 103 may destage the data from cache memory 114 to the capacity pool 111 based on the input information. In the example processes 500 and 600, although semi-synchronous compression and destaging processing are described, such processes can be synchronous or asynchronous as suitable for a given implementation.

The process 600 starts when the storage device 100 receives a write I/O from an accessing server. For example, at step 602 the I/O control 102 receives a write I/O including input information (e.g., metadata) and data.

At step 604, the I/O control 102 stores the received data and input information to cache memory 114. At step 606, the I/O control 102 sends a return response to the accessing server (e.g., host) to notify the write I/O is completed.

At step 608, the mapping control 103 accesses the cache memory 114 and compresses the data. At step 608 the mapping control 103 may also check the compressed length.

At step 610, the mapping control 103 searches for an empty area in the capacity pool 111 to store the compressed data. For example, the mapping control 103 may search for an empty storage area in the physical drives of the capacity pool 111. For example, the mapping control 103 may locate a contiguous empty area in the capacity pool where the compressed data, having a length or size as checked in step 608, can be stored.

At step 612, the mapping control 103 creates an entry in the mapping table 112 for the write I/O and registers the entry based on the input information and the empty area located at step 612. For example, mapping control 103 inputs a new entry into the mapping table 112 that includes a volume number 403 (e.g., a volume ID), volume LBA 404, original length 405 of the data written to the logical volume, pool LBA 406 of the empty area on the capacity pool 111, and compressed length 407 of the compressed data. Additionally, registering the new entry may include generating a sequence number 401 for the write I/O At step 614, the mapping control 103 stores the compressed data to the empty area and proceeds to step 616, where the process is terminated. At step 614, the mapping control 103 may insert a value for time 402 of the mapping table 112 from a timestamp indicative of the time that the storage device 100 received the write I/O (e.g., the write I/O of step 602) or indicative of the time that the storage device 100 sends the completion message to the server (e.g., step 603).

Figure 7:
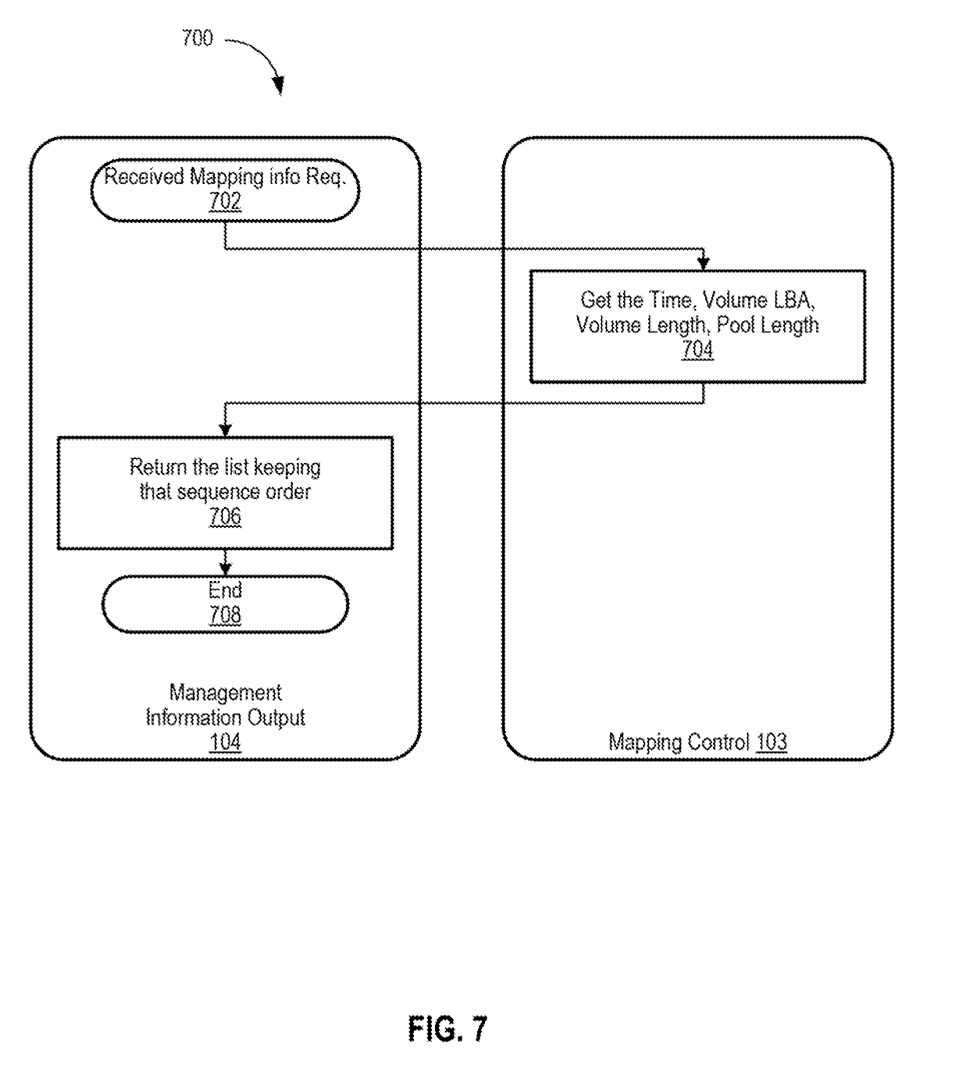
FIG. 7 illustrates a flow diagram of an example I/O log output process, in accordance with example implementations disclosed herein.

FIG. 7 illustrates a flow diagram of an example I/O log output process 700, in accordance with example implementations disclosed herein. The management information output 104 and mapping control 103 perform for I/O log output as process 700. The I/O log output process 700 may be performed in response to receiving a mapping information request, at the storage device 100, from a requesting server (e.g., server 200d, also referred to as a management server). The mapping information request may include request information (e.g., metadata), such as a request type, a target volume, and a time range. In operation, the management information output 104 outputs to a requesting server the log data received from the mapping control 103. Mapping control 103 gathers entries for the requested volume and requested time range from mapping table 112.

The process 700 starts when the storage device 100 receives an I/O log output request (also referred to herein as a mapping information request) from a requesting server. For example, at step 702 the management information output 104 receives a I/O log output request that includes request information (e.g., metadata) including information identifying a target volume and target time range. The time range may be any period of time as set by the requesting server. For example, the time range may have a lower limit (e.g., a start point) at a point in time prior to suspicion of infection by malware and have an upper limit (e.g., an end point) at a point in time after suspicion of infection. In some example implementations, the upper limit in time may be the current time or another time between the current time and a time of suspicion of infection.

At step 704, mapping control 103 gathers entries from the mapping table 112 corresponding to the volume and time range specified in the request. For example, the mapping table identifies all entries in the mapping table 112 that include a value for the target volume at volume number 403 and have values for time 402 within the target time range. Within the target time range may refer to identifying values of time 402 that are equal to or greater than the lower limit of the target time range and values that are equal to or less than the upper limit of the target time range. The mapping control 103 then retrieves the metadata (e.g., values) of the identified entries, including at least the values for the volume LBA 404, original length 405, pool LBA 406, and compressed length 407. The identified entries may include those entries that contain overwritten data (e.g., an entry with metadata where the pool LBA 406 is set to NULL).

At step 706, the management information output 104 formats the retrieved information for the requesting server and transmits a response to the requesting server with a list of the entries and corresponding metadata. For example, the management information output 104 creates a table of only the entries gathered at step 704 to create an I/O log of the gathered entries. The entries may be provided in an order based on the order written to the capacity pool 111 (e.g., the sequential order is maintained based on the sequence number 401 of each entry, but with entries that do not correspond to the target volume and target time range not present). In some implementations, the entries may be grouped by volume number, sorted by time (e.g., time 402), sorted by sequence number 401, and combinations thereof (e.g., first grouped by volume then ordered according to at least one of values of time 402 and sequence number 401). At step 708 the process is terminated.

Figure 8:
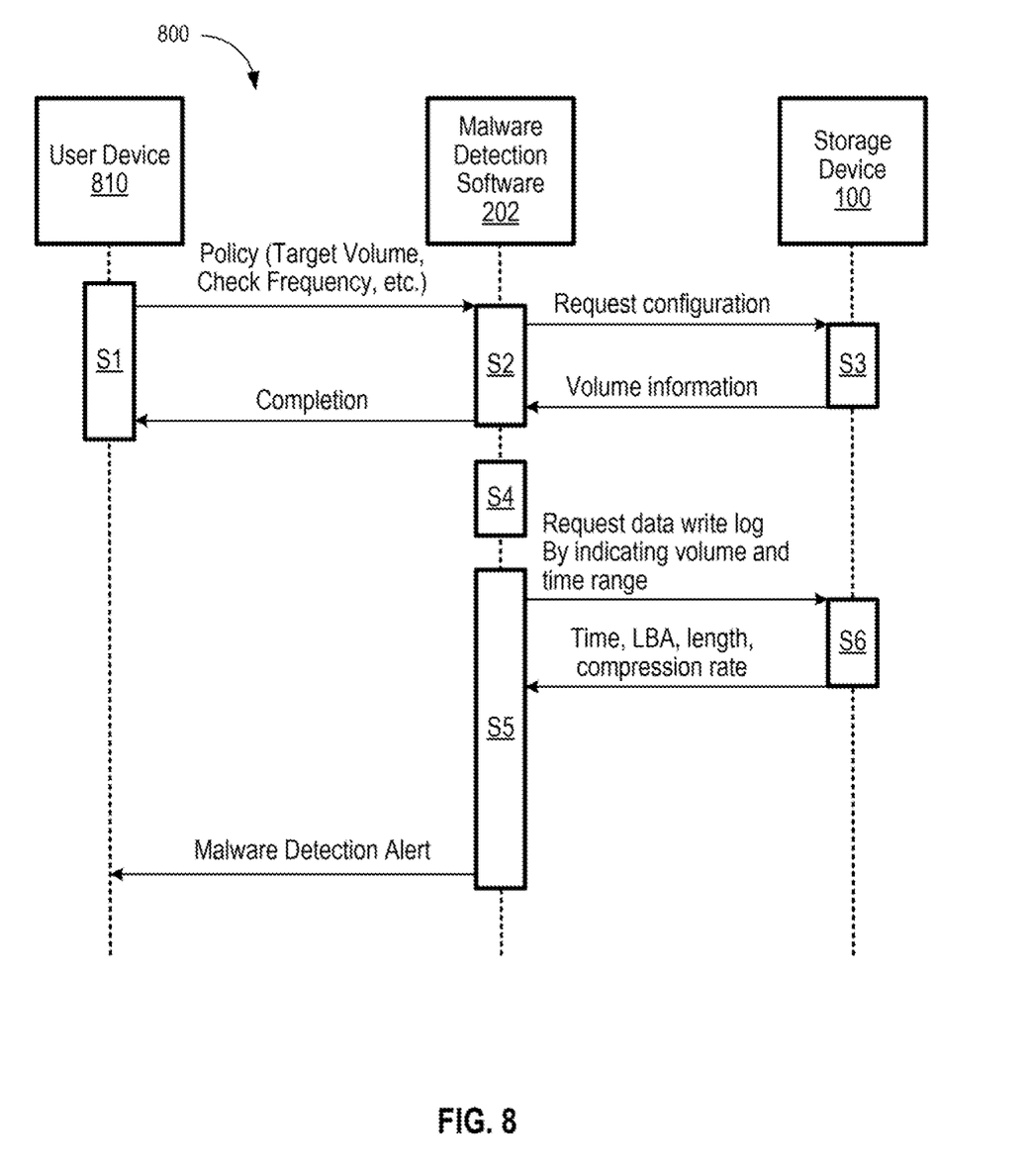
FIG. 8 illustrates a sequence chart of an example sequence for detecting data tampering, in accordance with example implementations disclosed herein.

FIG. 8 illustrates a sequence chart of an example sequence 800 for detecting data tampering, in accordance with example implementations disclosed herein. The sequence 800 is performed through interactions between a user device 810 (e.g., a device operated by an operator, administrator, or the like), malware detection software 202 (for example, executed by server 200d), and the storage device 100. In some example implementations, the exchange of requests and responses between the malware detection software 202 and the storage device 100 involves the use of the NIC of server 200d to connect to the management adapter of storage device 100 so to communicate with the management information output 104 of the storage device 100.

At S1, a monitoring policy for malware detection software 202 is set. For example, a user may input policy information, which includes, but is not limited to, one or more of target volumes, check frequency for each target volume, storage configuration information, target time range for each target volume, and etc. The policy information is then provided to malware detection software 202. In some example implementations, the user may input the monitoring policy into user device 810 connected to the server 200d via the network (e.g., wireless connection) or a wired connection. Examples of a user device 810 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like). The user device 810 then transmits the policy information to the malware detection software 200d via the wired or wireless connection. In another example implementation, the user may input the monitoring policy directly into the server 200d (e.g., server 200d may be implemented as user device 810) which then provides the policy information to the malware detection software 202.

At S2, the malware detection software 202 requests storage configuration information and, at S3 in response to the request at S2, the storage device 100 outputs actual configuration information to malware detection software 202. The malware detection software 202 then reconciles configuration information included with the policy information from the monitoring policy and the received actual configuration according to the monitoring policy from the user at S2. For example, the malware detection software 202 requests configuration information from the storage device 100 (S2), which the mapping control 103 retrieves from the configuration table 115. The management information output 104 provides the configuration information (e.g., actual configuration according to configuration table 115) to the malware detection software 202 (S3), which reconciles the received configuration information with the configuration information included with the policy information (S2). That is, for example, the storage configuration information of the configuration table 115 (e.g., the actual configuration) includes listing of volumes in the capacity pool 111 of the storage device 100. Retrieving the configuration information, by the malware detection software 202, permits the software 2020 to determine if the storage device 100 holds the information as a resource for the information set as a policy in the step S1. According to various examples, the malware detection software 202 only retrieves log information for volumes that are set as policy at S1 and are provided by the storage device 100 according to the configuration information.

At S2, after receiving storage configuration information from the storage device 100, if the configuration information matches between the input configuration from the malware detection software 202 and the actual configuration from the storage device 100, the malware detection software transmits a completion message to the user device 810.

At S4, the malware detection software 202 checks for software updates and updates the software if necessary (e.g., if there is an available update). The update check may be performed cyclically.

At S5, the malware detection software 202 executes malware detection according to the monitoring policy input from the user. For example, the malware detection software 202 gathers one or more I/O logs from Storage Device 100. The malware detection software 202 requests, from the storage device 100, an I/O log for each target volume included in the policy information. The request may specify a target time range, for example, the target time range may be the time range between the last request (e.g., a preceding request) and the current time, where the last request may be a lower limit of the time range and the current time may be the upper limit. The time range may be based on the check frequency included in the policy information, for example, the check frequency defines the frequency at which the malware detection software 202 transmits the request for I/O logs thereby setting the time range (e.g., the upper and lower limits) between each request. As another example, the target time range may be set separate from the check frequency, and may be based on a set time range having an upper limit and a lower limit as set by the user device 810 in the monitoring policy. In various example implementations, the request at S5 may be an example of a mapping information.

At S6, the storage device 100 gathers the requested I/O log(s). For example, the storage device 100 receives the request from the malware detection software 202 as illustrated at step 702 of FIG. 7; gathers the requested I/O log for each target volume according to the target time range in response to the request from the malware detection software 202 as illustrated at step 704 of FIG. 7; and then transmits the gathered I/O log(s) to the malware detection software 202 as illustrated at step 706 of FIG. 7.

Upon receipt of the requested I/O log(s) at S6, the malware detection software 202 checks I/O log information contained in the I/O log(s) to detect whether data tampering has occurred or not. For example, the malware detection software 202 may compare the received I/O log information against a previously received I/O log information (e.g., the most recent preceding I/O log information or another preceding I/O log information) and confirm whether or not the received (e.g., current) I/O log information is consistent with the preceding I/O log information. For example, characteristics (e.g., entropy values) of the I/O log may be compared with normal (e.g., not infected with malware) storage characteristics. In the case that the I/O log information is consistent, the malware detection software 202 determines that there was not data tampering within the time range. In the case that the I/O log information is not consistent (e.g., there is an unexpected difference in the I/O log information), the malware detection software 202 detects data tampering and issues an alert to the user notifying of the data tampering.

Figure 9:
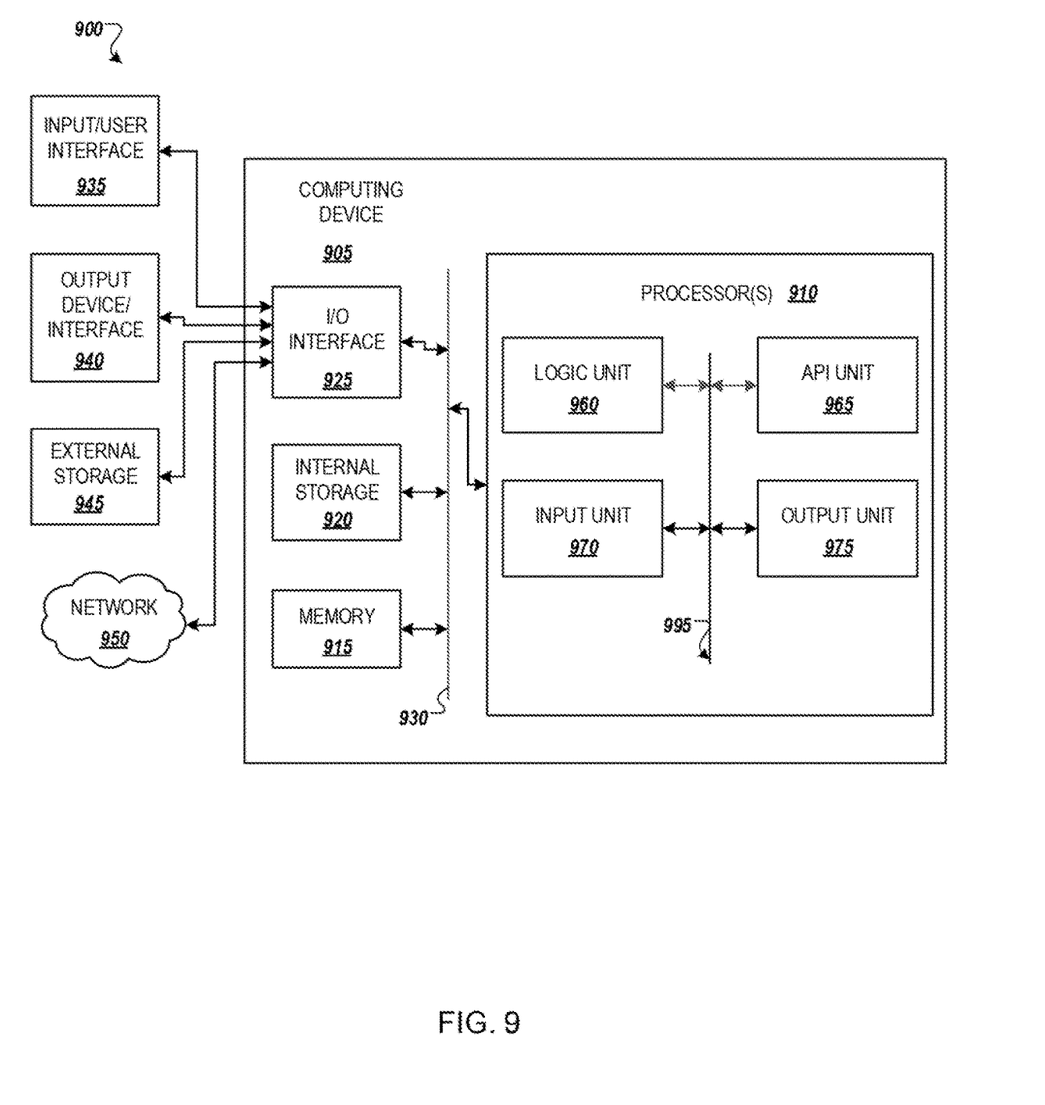
FIG. 9 illustrates an example computing environment with an example computer device suitable for use in some example implementations.

FIG. 9 illustrates an example computing environment with an example computer device suitable for use in some example implementations, such as a storage device 100 of FIGS. 1 and 2. In another example implementations, the computer device of FIG. 9 can be in the form of a management server (e.g., server 200d) as illustrated in FIGS. 1 and 2, that is configured to manage storage device 100 and/or detect data tampering in the storage device 100. Computer device 905 in computing environment 900 can include one or more processing units, cores, or processors 910, memory 915 (e.g., RAM, ROM, and/or the like), internal storage 920 (e.g., magnetic, optical, solid-state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of the input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). For example, where computer device 905 is implemented as the storage device 100, the input/user interface 935 may be implemented as the server 200d (or any one or more of servers 200a-200c) of FIGS. 1 and 2. As another example, where the computer device 905 is implemented as the server 200d of FIGS. 1 and 2, the input/user interface 935 may be implemented as the storage device 100. Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 915 can be configured to store one or more programs, such as Operating System (OS), Hypervisor, and applications. Memory 915 may be configured to store malware detection software 202, where the computer device 905 is implemented as the server 200d of FIG. 2. Memory 915 may be configured to store applications including I/O control 102, mapping control 103, and management information output 104, where the computer device 905 is implemented as the storage device 100 of FIG. 2. One or more of internal storage 920 and external storage (if applicable) may be configured to store the configuration table 115, mapping table 112, and the data 113 of FIG. 2.

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

Processor(s) 910 can be in the form of physical hardware processors (e.g., Central Processing Units (CPUs), field-programmable gate array (FPGA), application-specific integrated circuit (ASIC)) or a combination of software and hardware processors.

Processor(s) 910 can be configured to fetch and execute programs stored in memory 1115. When processor(s) 910 execute programs, processor(s) 910 fetch instructions of the programs from memory 915 and execute them. When processor(s) 910 execute programs, processor can load information such as illustrated in FIGS. 5-8 from memory. Processor(s) 910 can pre-fetch and cache instruction of programs and information to improve performance.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, the input unit 970, the output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide an output based on the calculations described in example implementations.

Processor(s) 910 can be configured to generate log information at a storage device based on a write input/output (I/O) provided to the storage device by one or more servers, as illustrated in FIG. 6. The log information generated by processor(s) 910 may include time information for storing the write I/O to the storage device, logical block information for the write I/O, and a compression ratio associated with storing the write I/O to the storage device, as illustrated in FIGS. 4 and 6. Processor(s) 910 may also be configured to, for a request by a management server, to provide the log information for a specified time range for the storage device, return, from the storage device, the logical block information and the compression ratio associated with the time information within the specified time range, as illustrated in FIGS. 7 and 8.

In example implementations, a management server (e.g., server 200d of FIG. 1) may be configured to execute malware detection software to detect malware from the logical block information and compression ratio returned by the processor(s) 910, as illustrated in FIG. 8. Where the management server is implemented as processor(s) 910, the processor(s) 910 may be configured to execute malware detection software to detect malware from returned logical block information and compression ratio, as illustrated in FIG. 8.

In example implementations, a management server may be configured to send the request to the processor(s) 910 (e.g., were the storage device 100 of FIG. 1 is implemented as processor(s) 910) cyclically based on a schedule provided by a user, as illustrated in FIG. 8. Where the management server is implemented as processor(s) 910, the processor(s)

910 may be configured to send the request to the storage device 100 of FIG. 1 cyclically based on a schedule provided by the user.

In some example implementations, the processor(s) 910 may be configured to periodically insert time information as a marker into the log information. In some example implementations, the processor(s) 910 may be configured to extract time information from metadata associated with logical block information of the write I/O.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for detecting damage to data by malware, the method comprising:
    generating log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and
    for a request by a management server to provide the log information for a specified time range for the storage device, returning, from the storage device, the logical block information and the compression ratio associated with the time information within the specified time range.

2. The method of claim 1, wherein the management server executes malware detection software to detect malware from the returned logical block information and compression ratio.

3. The method of claim 1, wherein the management server sends the request to the storage device cyclically based on a schedule provided by a user.

4. The method of claim 1, wherein the time information is a marker inserted periodically into the log information.

5. The method of claim 1, wherein the time information is from metadata associated with the logical block information.

6. A system for detecting damage to data by malware, the system comprising:
    a storage device configured to generate log information at a storage device based on a write input/output (I/O) provided to the storage device by one or more servers, the log information comprising time information for storing the write I/O to the storage device, logical block information for the write I/O, and a compression ratio associated with storing the write I/O to the storage device; and
    a management server configured to request the storage device provide the log information for a specified time range,
    the storage device is further configured to, for the request by the management server, provide the log information, return the logical block information and the compression ratio associated with the time information within the specified time range.

7. The system of claim 6, wherein the management server executes malware detection software to detect malware from the returned logical block information and compression ratio.

8. The system of claim 6, wherein the management server sends the request to the storage device cyclically based on a schedule provided by a user.

9. The system of claim 6, wherein the time information is a marker inserted periodically into the log information.

10. The system of claim 6, wherein the time information is from metadata associated with the logical block information.

11. A storage device for detecting damage to data by malware, the storage device comprising:
one or more memory configured to store instructions; and
one or more processors configured to execute the instructions stored in the memory to:
generate log information at the storage device based on a write input/output (I/O) provided to the storage device by one or more servers, the log information comprising time information for storing the write I/O to the storage device, logical block information for the write I/O, and a compression ratio associated with storing the write I/O to the storage device; and
for a request received from a management server to provide the log information for a specified time range, return, to the management server, the logical block information and the compression ratio associated with the time information within the specified time range.

12. The storage device of claim 11, wherein the management server executes malware detection software to detect malware from the returned logical block information and compression ratio.

13. The storage device of claim 11, wherein the management server sends the request to the storage device cyclically based on a schedule provided by a user.

14. The storage device of claim 11, wherein the time information is a marker inserted periodically into the log information.

15. The storage device of claim 11, wherein the time information is from metadata associated with the logical block information.

\* \* \* \* \*